United States Patent
Rink et al.

(10) Patent No.: US 10,602,408 B2
(45) Date of Patent: Mar. 24, 2020

(54) RESOURCE CONTROL IN A SHARED RAN

(71) Applicant: Affirmed Networks Communications Technologies, Inc., Acton, MA (US)

(72) Inventors: Fred Rink, Fairview, TX (US); Haibo Qian, Frisco, TX (US); Michael Anthony Brown, McKinney, TX (US)

(73) Assignee: AFFIRMED NETWORKS COMMUNICATIONS TECHNOLOGIES, INC., Acton, MA (US)

( * ) Notice: Subject to any disclaimer, the term of this patent is extended or adjusted under 35 U.S.C. 154(b) by 0 days.

(21) Appl. No.: 15/895,731

(22) Filed: Feb. 13, 2018

(65) Prior Publication Data

US 2018/0234885 A1 Aug. 16, 2018

Related U.S. Application Data

(60) Provisional application No. 62/458,260, filed on Feb. 13, 2017.

(51) Int. Cl.
*H04W 16/04* (2009.01)
*H04W 28/16* (2009.01)
(Continued)

(52) U.S. Cl.
CPC .......... *H04W 28/16* (2013.01); *H04W 16/04* (2013.01); *H04W 28/0247* (2013.01);
(Continued)

(58) Field of Classification Search
CPC ............. H04W 28/16; H04W 28/0268; H04W 28/0247; H04W 28/0252; H04W 16/04;
(Continued)

(56) References Cited

U.S. PATENT DOCUMENTS

2011/0320608 A1  12/2011  Nelakonda et al.
2013/0083653 A1*  4/2013  Jain ................... H04W 4/70
                                                    370/230

(Continued)

FOREIGN PATENT DOCUMENTS

EP       3059903 A1     8/2016

OTHER PUBLICATIONS

3GPP TS 23.236 v13.0.0, "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).

(Continued)

*Primary Examiner* — Curtis A Alia
(74) *Attorney, Agent, or Firm* — Wilmer Cutler Pickering Hale and Dorr LLP

(57) ABSTRACT

Example implementations are directed to a method and an apparatus for managing one of a plurality of core networks (CNs) sharing a radio access network (RAN), which may receive a RAN resource allocation control type indicator associated with at least one CN of the plurality of CNs. The RAN resource allocation control type indicator be at least one of: a guaranteed minimum allocation of RAN resources, an absolute allocation of RAN resources, and a percentage-based allocation of RAN resources. The method and apparatus may further include determining a RAN resource allotment parameter for the at least one CN of the plurality of CNs. The RAN resource allotment parameter and an identification of the associated at least one CN may be transmitted to a traffic controller such that the at least one CN is allocated an amount of RAN resources based on the resource allotment value may.

20 Claims, 11 Drawing Sheets

(51) Int. Cl.
H04W 72/04 (2009.01)
H04W 72/10 (2009.01)
H04W 72/08 (2009.01)
H04W 48/06 (2009.01)
H04W 28/02 (2009.01)
H04L 12/911 (2013.01)

(52) U.S. Cl.
CPC ......... *H04W 48/06* (2013.01); *H04W 72/048* (2013.01); *H04W 72/0433* (2013.01); *H04W 72/0493* (2013.01); *H04W 72/085* (2013.01); *H04W 72/10* (2013.01); *H04L 47/781* (2013.01); *H04W 28/0252* (2013.01); *H04W 28/0268* (2013.01)

(58) Field of Classification Search
CPC ... H04W 48/06; H04W 72/10; H04W 72/085; H04W 72/0433; H04W 72/048; H04W 72/0493
See application file for complete search history.

(56) References Cited

U.S. PATENT DOCUMENTS

2013/0303114 A1 11/2013 Ahmad et al.
2014/0029529 A1 1/2014 Gogic et al.

OTHER PUBLICATIONS

3GPP TS 23.401 V13.9.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).

International Search Report and Written Opinion issued by the European Patent Office as International Searching Authority, issued in International Application No. PCT/US2018/15276, dated Apr. 20, 2018 (21 pages).

Aggarawal, et al., "MPLS Upstream Label Assignment and Context-Specific Label Space", Internet Engineering Task Force, IETF; Standard, Internet society (ISOC) 4, Rue Des Falaises, Geneva, Switzerland, Aug. 1, 2008 (13 pages).

3GPP, TS 33.210, v.14.0.0, "3rd Generation Partnership Project; Technical Specification Group Services and System Aspects; 3G Security; Network Domain Security (NDS); IP Network Layer Security (Release 14)", Valbonne, France, Dec. 2016 (24 pages).

3GPP, TS 23.401 v.14.0.0, "3rd Generation Partnership Project; Technical Specification Group Services and System Aspects; General Packet Radio Services (GPRS) Enhancements for Evolved Universal Terrestrial Radio Access Network (E-UTRAN) Access (Release 14)", Valbonne, France, Jun. 2016 (374 Pages).

ETSI Standard, ETSI RES 282 003 v0.8.9, "Telecommunications and Internet Converged Services and Protocols for Advanced Networking (TISPAN); Resource and Admission Control Sub-System (RACS); Functional Architecture; Release 2", Cedex, France, Oct. 2007 (143 Pages).

International Search Report and Written Opinion issued by the European Patent Office as International Searching Authority, issued in International Application No. PCT/US18/18023, dated May 15, 2018 (13 pages).

\* cited by examiner

RESOURCE CONTROL IN A SHARED RAN

CROSS REFERENCE TO RELATED APPLICATIONS

This application claims the benefit under 35 U.S.C. § 119(e) to U.S. Provisional Application No. 62/458,260, entitled "ADMISSION CONTROL IN A SHARED RAN," filed on Feb. 13, 2017, the contents of which are incorporated by reference herein in its entirety.

TECHNICAL FIELD

The present disclosure relates generally to radio access network (RAN) technology, and more specifically, to conducting admission control in a shared RAN.

BACKGROUND

Third Generation Partnership Project (3GPP) architecture supports the possibility of having the cellular RAN connect to multiple Packet Core Networks (CN). 3GPP defines the deployment of the RAN equipment to different CNs as a RAN sharing architecture. Examples of 3GPP RAN technologies includes GERAN (2G), UTRAN (3G), and E-UTRAN (4G).

In related art implementations, cellular operators typical deploy a CN to service their own subscriber devices. Operators may deploy a shared RAN architecture to reduce their cost of building out wireless coverage. In doing so, operators may define shared cellular coverage areas, and the RAN equipment in these coverage areas may be used to support devices from all of the operators sharing that RAN coverage area CN.

In related art implementations, cellular operators generally deploy a single CN to handle their own subscriber devices. All of the RAN equipment for a given coverage area will connect to this single CN for devices associated with that particular cellular operator. Historically, the vast majority of subscriber devices supported are consistent in how they are used by the end user or application and how they interact with the cellular RAN and CN. For example, any given cell phone will typically interact with cellular RAN and the its associated CN similarly to other cell phones.

In related art implementations, operators are increasing their support of more diverse set of subscriber devices on their network. Extended subscriber device support involves new deployment use cases such that operators may deploy multiple core networks, with each core network handling different categories of subscriber devices (e.g., smartphones, cars, power meters, agricultural sensors, medical devices, home appliances, etc.) while sharing the same RAN equipment.

In an example related art implementation, an operator traditionally operated a Long-Term Evolution (LTE) network involving a single CN and single RAN configured to handle all the subscriber devices of the operator. However, the diversity of subscriber devices has increased. Operators have attempted to extend their subscriber base, for example, by offering special promotions for agriculture businesses to add farm sensors to the cellular network. Sensors have vastly different usage patterns and network requirements than other user equipment (UE) such as a smartphone or laptop. Accordingly, an operator may deploy a second CN specifically configured to handle the unique network requirements of these sensors. In this example the operator would deploy a second complete CN and connect the second CN to the shared RAN. During UE CN selection time, devices on the shared RAN will be routed to the correct CN. In this example related art implementation, the shared RAN allocates and manages resources by known 3GPP Quality of Service (QoS) methods. However, existing QoS methods do not ensure a CN is guaranteed a portion of the available shared RAN resources; e.g. a CN created for lower devices may never be allocated RAN resources, such as blocks or units based on time or frequency including but not limited to data radio bearers, during periods of high usage by other higher priority CNs.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. In related art deployments where there is a shared RAN and multiple CNs, there are no defined methods to arbitrate the usage of RAN resources between the different CNs. Example implementations of the present disclosure are directed to systems and methods by which multiple CNs utilize a shared RAN to arbitrate the usage of RAN resources between the different CNs.

In general, in one aspect, the invention features a computerized method for managing one of a plurality of core networks (CNs) sharing a radio access network (RAN), the method comprising: receiving, by a computing device, a RAN resource allocation control type indicator associated with at least one first CN of the plurality of CNs, the RAN resource allocation control type indicator comprising at least one of: a guaranteed minimum allocation of RAN resources, an absolute allocation of RAN resources, and a percentage-based allocation of RAN resources; receiving, by the computing device, a RAN resource allocation control value associated with the at least one first CN of the plurality of CNs; determining, by the computing device, a RAN resource allotment parameter for the at least one first CN of the plurality of CNs, wherein the determining is based on: the RAN resource allocation control value associated with the at least one first CN when the at least one first CN is associated with a guaranteed minimum allocation of RAN resources RAN resource allocation control type indicator, the RAN resource allocation control value associated with the at least one first CN when the at least one first CN is associated with an absolute allocation of RAN resources RAN resource allocation control type indicator, or the RAN resource allocation control value associated with the at least one first CN and at least one RAN resource allocation control value associated with another CN of the plurality of CNs when a CN is associated with a percentage-based allocation of RAN resources RAN resource allocation control type indicator; and transmitting, by the computing device, to a node of a traffic controller the RAN resource allotment parameter and an identification of the associated at least one first CN such that the at least one first CN is allocated an amount of RAN resources based on the resource allotment value.

In another aspect, the invention features a computerized method including a resource allotment parameter that comprises at least one of: a maximum amount of RAN resources to be provided to at least one first CN; and a minimum guaranteed amount of RAN to be provided to the at least one first CN.

In another aspect, the invention features a computerized method including receiving, by the node of the traffic controller, the RAN resource allotment parameter for the at least one first CN; receiving, by a node of the traffic controller, an indication of RAN resource usage for the least one CN; determining, by the traffic controller, an amount of RAN resources to be allocated to the at least one first CN, wherein the determining is based on at least one of: the resource allotment parameter for the at least one first CN and an indication of RAN resource usage for the at least one first CN when the RAN resource allotment parameter for the at least one first CN comprises a maximum amount of RAN resources to be provided to the at least one first CN, the resource allotment parameter for at least one other CN and an indication of RAN resource usage for the at least one other CN when the RAN resource allotment parameter for the at least one first CN comprises a guaranteed minimum amount of RAN resources to be provided to the at least one first CN, and the resource allotment parameter for the at least one first CN and an indication of RAN resource usage for the at least one first CN when the RAN resource allotment parameter for the at least one first CN comprises a guaranteed minimum amount of RAN resources to be provided to the at least one first CN; and controlling traffic, by the traffic controller, for at least one device associated with the at least one first CN, based on the amount of RAN resources to be allocated to the at least one first CN.

In another aspect, the invention features a computerized method including controlling traffic which comprises at least one of (a) limiting attachment or mobility of a user equipment (UE) into a RAN coverage area, (b) modifying per device bearer QoS attributes in the RAN coverage area when available RAN resources are exceeded, and (c) managing user traffic based on an indicated QoS level, wherein managing user traffic includes at least one of deferring, preempting, and rejecting traffic for lower priority user data In another aspect, the invention features a computerized method including receiving, by the computing device, a second RAN resource allocation control type indicator associated with a second CN of the plurality of CNs; and receiving, by the computing device, a second RAN resource allocation control value associated with a second CN of the plurality of CNs, wherein the RAN resource allocation control type indicator associated with the at least one first CN of the plurality of CNs is different from the second RAN resource allocation control type indicator and the RAN resource allocation control value associated with the at least one first CN of the plurality of CNs is different from the second RAN resource allocation control value.

In another aspect, the invention features a computerized method including at least one first CN servicing mobile devices, and the second CN servicing machine type devices.

In another aspect, the invention features a computerized method including processing loading information from the RAN indicative of RAN congestion; adjusting at least one of the indication of RAN resource usage for the least one CN or an indication of RAN resource usage for at least one other CN based on the loading information; and transmitting the adjusted indication to the traffic controller.

In another aspect, the invention features a computerized method including processing loading information from a RAN congestion awareness function; adjusting at least one of the indication of RAN resource usage for the least one CN or an indication of RAN resource usage for at least one other CN based on the loading information; and transmitting the adjusted indication to the RAN.

In another aspect, the invention features a computerized method including determining a periodic location update timer value for one or more user equipment (UE); determining a periodic location update timer value for the one or more (UE) based on a determination of a non-peak time; and adjusting the periodic location update timer value to be during the non-peak time In another aspect, the invention features a computerized method including a periodic location update timer that is based on at least one of a provided timer value from the one or more UE, a provided timer value from a home subscriber server (HSS) or a home location register (HLR), and a local MME/SGSN configuration In general, in another aspect, the invention features an apparatus for managing one of a plurality of core networks (CNs) sharing a radio access network (RAN), the apparatus comprising: memory coupled to the processor and including computer-readable instructions that, when executed by a processor, cause the processor to: receive a RAN resource allocation control type indicator associated with at least one first CN of the plurality of CNs, the RAN resource allocation control type indicator comprising at least one of: a guaranteed minimum allocation of RAN resources, an absolute allocation of RAN resources, and a percentage-based allocation of RAN resources; receive a RAN resource allocation control value associated with the at least one first CN of the plurality of CNs; determine a RAN resource allotment parameter for the at least one first CN of the plurality of CNs, wherein the determining is based on: the RAN resource allocation control value associated with the at least one first CN when the at least one first CN is associated with a guaranteed minimum allocation of RAN resources RAN resource allocation control type indicator, the RAN resource allocation control value associated with the at least one first CN when the at least one first CN is associated with an absolute allocation of RAN resources RAN resource allocation control type indicator, or the RAN resource allocation control value associated with the at least one first CN and at least one RAN resource allocation control value associated with another CN of the plurality of CNs when a CN is associated with a percentage-based allocation of RAN resources RAN resource allocation control type indicator; and transmit to a node of a traffic controller the RAN resource allotment parameter and an identification of the associated at least one first CN such that the at least one first CN is allocated an amount of RAN resources based on the resource allotment value.

In another aspect, the invention features a resource allotment parameter that comprises at least one of: a maximum amount of RAN resources to be provided to the at least one first CN; and a minimum guaranteed amount of RAN to be provided to the at least one first CN.

In another aspect, the invention features a traffic controller is further configured to: receive the RAN resource allotment parameter for the at least one first CN; receive an indication of RAN resource usage for the least one CN; determine an amount of RAN resources to be allocated to the at least one first CN, wherein the determining is based on at least one of: the resource allotment parameter for the at least one first CN and an indication of RAN resource usage for the at least one first CN when the RAN resource allotment parameter for the at least one first CN comprises a maximum amount of RAN resources to be provided to the at least one first CN, the resource allotment parameter for at least one other CN and an indication of RAN resource usage for the at least one other CN when the RAN resource allotment parameter for the at least one first CN comprises a guaranteed minimum amount of RAN resources to be provided to the at least one first CN, and the resource allotment parameter for the at least one first CN and an indication of RAN resource usage for the at least one first CN when the RAN resource allotment parameter for the at least one first CN comprises a guaranteed minimum amount of RAN resources to be provided to the at least one first CN; and control traffic for at least one device associated with the at least one first CN, based on the amount of RAN resources to be allocated to the at least one first CN.

In another aspect, the invention features a the traffic controller that is further configured to control traffic by at least one of (a) limiting attachment or mobility of a user equipment (UE) into a RAN coverage area, (b) modifying per device bearer QoS attributes in the RAN coverage area when available RAN resources are exceeded, and (c) managing user traffic based on an indicated QoS level, wherein managing user traffic includes at least one of deferring, preempting, and rejecting traffic for lower priority user data.

In another aspect, the invention features an apparatus that is caused to: receive a second RAN resource allocation control type indicator associated with a second CN of the plurality of CNs; and receive a second RAN resource allocation control value associated with a second CN of the plurality of CNs, wherein the RAN resource allocation control type indicator associated with the at least one first CN of the plurality of CNs is different from the second RAN resource allocation control type indicator and the RAN resource allocation control value associated with the at least one first CN of the plurality of CNs is different from the second RAN resource allocation control value.

In another aspect, the invention features at least one first CN that services mobile devices, and a second CN that services machine type devices.

In another aspect, the invention features a loading element configured to: process loading information from the RAN indicative of RAN congestion; adjust at least one of the indication of RAN resource usage for the least one CN or an indication of RAN resource usage for at least one other CN based on the loading information; and transmit the adjusted indication to the traffic controller.

In another aspect, the invention features a loading element configured to: process loading information from a RAN congestion awareness function; adjust at least one of the indication of RAN resource usage for the least one CN or an indication of RAN resource usage for at least one other CN based on the loading information; and transmit the adjusted indication to the RAN.

In another aspect, the invention features a timing controller configured to: determine a periodic location update timer value for one or more user equipment (UE); determine a periodic location update timer value for the one or more (UE) based on a determination of a non-peak time; and adjust the periodic location update timer value to be during the non-peak time.

In another aspect, the invention features a periodic location update timer that is based on at least one of a provided timer value from the one or more UE, a provided timer value from a home subscriber server (HSS) or a home location register (HLR), and a local MME/SGSN configuration.

Aspects of the present disclosure includes an apparatus managing one of a plurality of core networks (CNs) sharing a resource area network (RAN), which can involve a processor, configured to transmit, to a node of the RAN, an indication of an amount of RAN resources to be allocated from the RAN to the apparatus, the indication being one of: a percentage based indication of RAN resources to be allocated to the apparatus and/or a guaranteed minimum of resources for the apparatus; and receive an allocation of RAN resources based on an arbitration of the node of the RAN, the arbitration based on indications received from the plurality of CNs.

Aspects of the present disclosure can further include a method for an apparatus managing one of a plurality of core networks (CNs) sharing a resource area network (RAN), the method including transmitting, to a node of the RAN, an indication of an amount of RAN resources to be allocated from the RAN to the apparatus, the indication being one of: a percentage based indication of RAN resources to be allocated to the apparatus and a guaranteed minimum of resources for the apparatus; and receiving an allocation of RAN resources based on an arbitration of the node of the RAN, the arbitration based on indications received from the plurality of CNs.

Aspects of the present disclosure can further include a non-transitory computer readable medium storing instructions for an apparatus managing one of a plurality of core networks (CNs) sharing a resource area network (RAN), the instructions including transmitting, to a node of the RAN, an indication of an amount of RAN resources to be allocated from the RAN to the apparatus, the indication being one of: a percentage based indication of RAN resources to be allocated to the apparatus and a guaranteed minimum of resources for the apparatus; and receiving an allocation of RAN resources based on an arbitration of the node of the RAN, the arbitration based on indications received from the plurality of CNs.

Aspects of the present disclosure includes an apparatus managing one of a plurality of core networks (CNs) sharing a resource area network (RAN), which can involve a processor, configured to determine the current RAN loading for given CN from a variety of inputs including loading as received directly from the RAN, loading from external sources in the operator network, and based on local RAN loading calculation.

DETAILED DESCRIPTION

Figure 1:
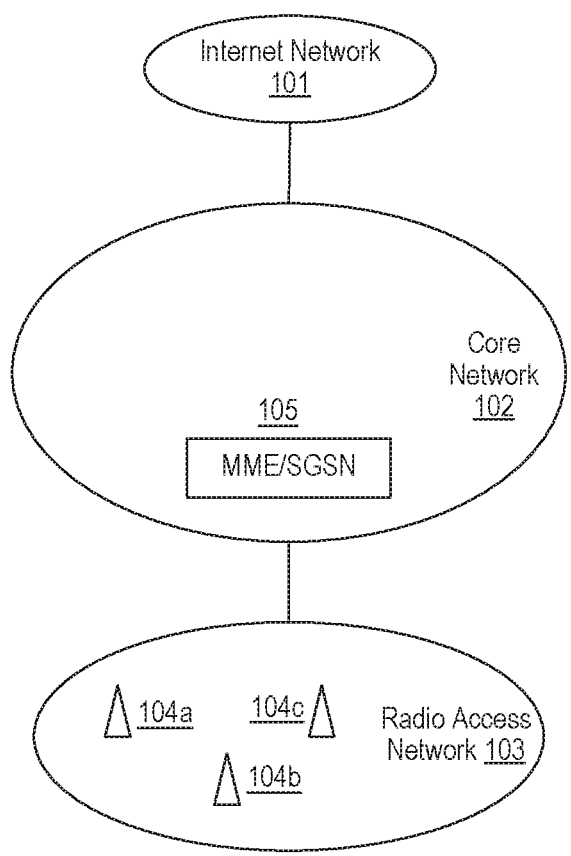
FIG. 1 illustrates an example cellular wireless deployment.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The wireless industry predications show a significant escalation in the number of devices using cellular technology for connecting to the internet. Existing networks may need to evolve to handle both the number of devices as well as the diversity in the types of devices. One of the big growth areas is adding machine type devices to the wireless network; e.g., power meters, cars, home appliances, medical devices, agricultural sensors, etc. Deploying multiple core networks allows wireless operators to address this growth and device diversity.

As a wireless operator adds multiple core networks, the necessity of managing the use of the shared RAN will become an issue. The example implementations described herein address this challenge.

In example implementations the traffic generated by devices may be better managed using multiple CNs to allow the network to service more devices. An example implementation involves optimizing device location reporting. In an example implementation, the optimization may include making the location report timer dynamic based on the time of day.

In example implementations, allocation of RAN resource across multiple CNs can involve an indication provided by a CN to the RAN that includes the relative amount of RAN resources a CN is allowed, as compared to the other CNs sharing the RAN resources. This indication could either be a simple percentage based indication (e.g., this core network is allowed X % of the RAN capacity), or alternatively a request for a guaranteed floor of resources allowed for that core during times of congestion.

In example implementations when deploying multiple core networks with a shared RAN, each core network may require visibility to the actual resource utilization allocated to that core. This visibility can be realized by the Mobility Management Entity (MME) or Serving GPRS (General Packet Radio Service) Support Node (SGSN) receiving a current loading condition of the RAN. This may be received by a number of different sources, such as directly from the RAN or through an external function like the 3GPP defined RAN Congestion Awareness Function (RCAF). With this actual RAN utilization, the respective CNs can invoke loading reduction steps when the loading information indicates a congestion/overload condition. Congestion/overload reduction implementations can include, but are not limited to, denying or limiting attachment or mobility, modification of Quality of Service (QoS) settings for a device bearer service, and/or delaying a devices activity on the network. An example of delaying an activity could include a core network customizing the periodic Tracking Area Update (TAU)/Routing Area Update (RAU) values provided to the devices to allow periodic UE reporting during nonpeak hours. The MME/SGSN can indicate to the device to initiate the next periodic TAU/RAU during a non-peak time. In example implementations, an operator may choose to delay device activities in a particular core network that includes many, mostly, or only delay tolerant and/or low mobility devices. For example, certain machine-type devices may be less mobile, and therefore may not require frequent activity during high congestion periods of peak usage hours. Mobile devices, such as, but not limited to cellphones and other computerized devices that frequently communicate with the RAN for internet access and communication purposes, may require more frequent activity even during high congestion periods or peak usage hours.

In example implementations of the present disclosure, systems and methods are provided for the multiple CNs to provide an indication from the core to the RAN regarding the relative amount of RAN resources that a given CN is allowed, as well as systems and methods for managing RAN resources when the RAN is in overload/congestion. In example implementations of the present disclosure, there are methods and systems for the MME/SGSN to calculate the periodic TAU/RAU values so that the TAU/RAU processes can be initiated during non-peak hours.

FIG. 1 illustrates an example cellular wireless deployment, which can involve infrastructure for an internet network 101, a CN 102 and a RAN 103. The RAN 103 may include multiple RAN devices 104a, 104b, 104c, such as but not limited to cell sites. In an example cellular wireless architecture, the operator deploys a RAN 103 supporting the Radio Access Technologies (RAT) of the wireless operator, such as GERAN, UTRAN, E-UTRAN, or 5G NR. In general, the RAN 103 handles cellular communication with the end device. The RAN 103 is connected to a CN 102 which handles the authentication, mobility, and session management for the end device (e.g., the device can be allowed to access the network, seamlessly move between RAN nodes, and send/receive user data), or other functions not delegated to RAN 103. Within the CN 102, the RAN equipment may connect to one more core network elements 105 for purposes of redundancy and network scaling. As an example, core network elements 105 may include one or more MME/SGSNs in CN 102. The CN 102 may have multiple connections to RAN 103, for example, for each or subsets of core network elements 105. Using multiple connections from RAN 103 to CN 102 provides redundancy in case any one of the MME/SGSNs is unavailable. CN 102 is treated as one logical CN regardless of the number of RAN devices 104a, 104b, 104c in RAN 103 connected to CN 102.

Figure 2:
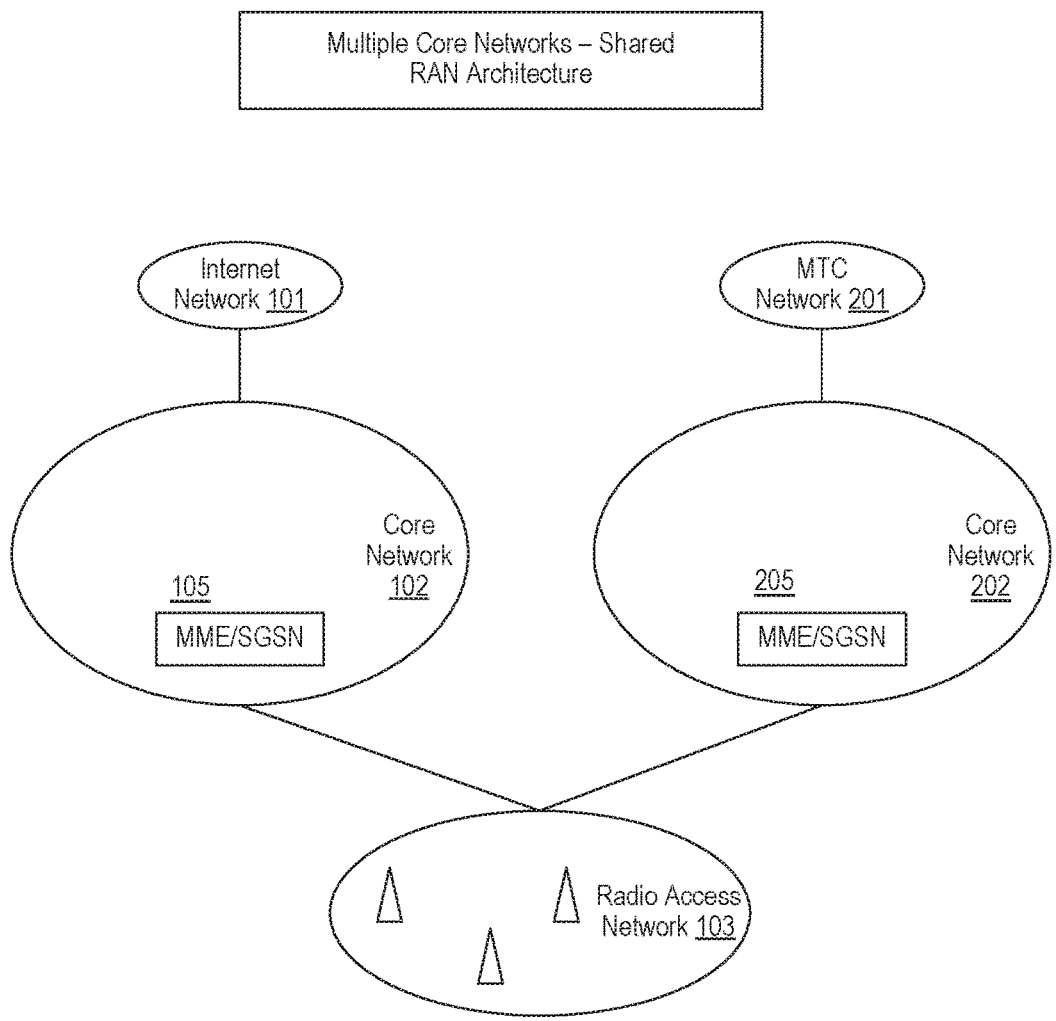
FIG. 2 illustrates a network architecture that involves multiple CNs in accordance with an example implementation.

FIG. 2 illustrates a network architecture that involves multiple CNs in accordance with an example implementation. As illustrated in FIG. 2, CN 102 and CN 202 are two separate logical CNs. According to an embodiment, CN 102 may service general wireless operator devices, such as but not limited to cellphones, while CN 202 may service all machine type communication (MTC) devices. It should be appreciated that a wireless operator may deploy a network architecture that includes multiple CNs connecting to a single shared RAN as illustrated in FIG. 2, and that each CN may be designed to services certain types, classes, or subsets of devices. Although FIG. 2 illustrates only two CNs 102 and 202, a wireless operator may choose to implement more CNs.

In a deployment with multiple CNs and a single shared RAN 103, the RAN 103 can connect to multiple CNs. The RAN 103 may serve the function of routing a device to the correct CN. According to the embodiment of FIG. 2, RAN 103 may route a device to either CN 102 or CN 202. Selection by the RAN 103 of which of CNs 102 and 202 to use for a given device may be accomplished through standard 3GPP defined methods. By way of a non-limiting example, routing may be accomplished through the selected Public Land Mobile Network (PLMN) of the device, or based on a negotiation with one of CNs 102, 202. The UE may be anchored on one of the CNs 102 at a time. As an example, as seen in FIG. 2 and as discussed above, a wireless operator may choose to deploy a second CN 202 to handle MTC devices for an MTC network 201. According to a non-limiting example, CN 202 or RAN 103 may keep all other devices on the internet network 101 associated with CN 102. MTC devices may have a predetermined CN feature set and network usage pattern, and may be more delay tolerant than other devices. Such attributes, among other attributes, may lead an operator to decide to isolate these device types on their own CN 202 associated with MTC network 201. It should be appreciated that an operator may implement multiple types of networks, and may implement individual CNs to interface with subsets of the networks or for each network. Such subsets may be drawn based on characteristics of the network or shared attributes among devices that interface with the network.

In an example implementation, an MME/SGSN can provide an indication to the RAN regarding the relative amount of RAN resources on RAN 103 to be allocated to each CN as compared to the other CNs sharing the RAN resources. As shown in FIG. 2, one or each of MME/SGSN 105, 205 may communicate to RAN to indicate a relative amount of RAN resources to be allocated to CNs 102, 202, respectively. In example implementations, the provided indication can either be a percentage based indication (e.g., an associated CN is allowed X % of the RAN capacity), or a guaranteed floor of resources allowed for that CN.

A RAN has a finite amount of RAN resources that can be used. If the amount of RAN resources requested by the devices connected to the RAN exceeds the available resources, the RAN may need to arbitrate those resources. Current arbitration by the RAN uses 3GPP QoS attributes (e.g., Traffic Class, QoS Class Identifier, Allocation and Retention Priority, Aggregate Maximum Bit Rate, Guaranteed Bit Rate, Maximum Bit Rate, etc.) for the device bearers. In a shared RAN deployment, the RAN may benefit from an additional method of allocating resources, beyond defined bearer level QoS attributes, to ensure each CN is guaranteed an agreed or preset amount of the RAN resources.

Using the example as illustrated in FIG. 2, a wireless operator has deployed two separate core networks, CN 102 and CN 202. CN 202 may exclusively service the operator machine-to-machine (M2M) or MTC related devices, while CN 102 handles all other devices, such as, but not limited to cellular devices. By way of a non-limiting example, if the operator viewed the MTC related devices (CN 202) as having lower priority than other devices, there could be cases where the RAN 103 may not allocate resources to the CN 202 related devices when all the RAN resources are needed by CN 102. According to another embodiment, the operator could guarantee CN 202 still is allocated some RAN resources. For example, CN 202 may be allocated a specific amount of RAN resources, such as a predetermined percentage or a minimum amount of resources.

Figure 3:
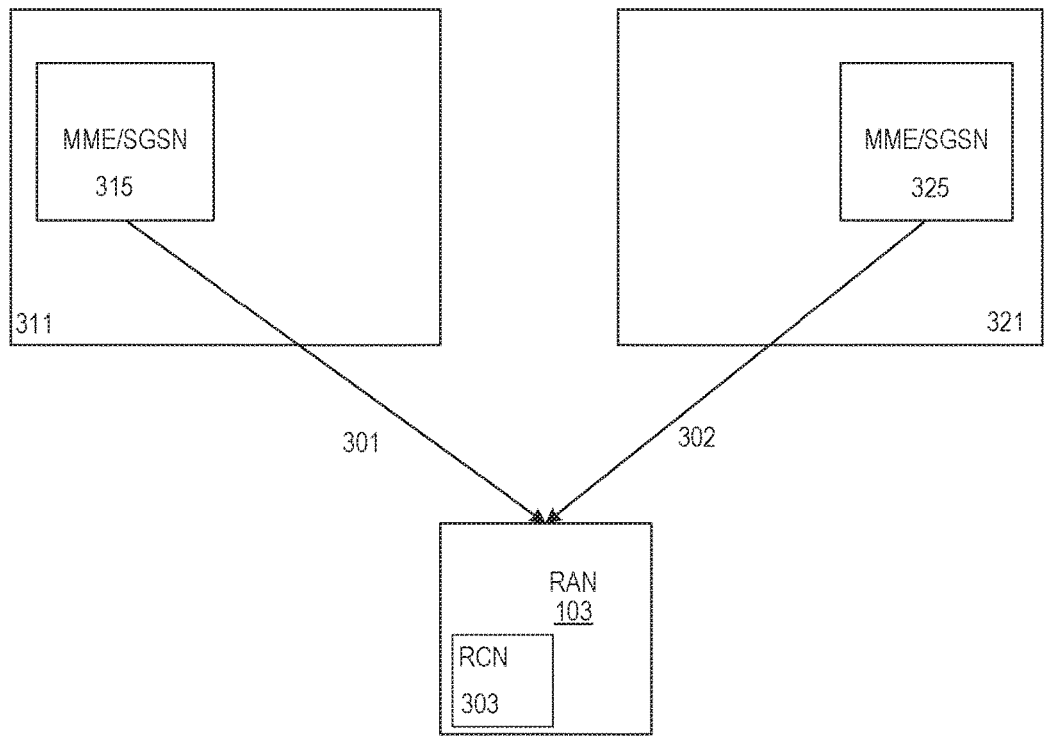
FIG. 3 illustrates an example of CNs using a shared RAN, in accordance with an example implementation.

FIG. 3 illustrates an example of multiple CNs using a shared RAN 103, in accordance with an example implementation. Specifically, the example of FIG. 3 illustrates two CNs, CN 1 and CN 2 using a single shared RAN 103 with an absolute allocation of RAN resources. Absolute allocation may include providing the specific amount of RAN resources to be allocated to a particular CN. Absolute allocation is expressed as a general number in units of RAN resources. According to another embodiment, the RAN may sum the value received from each CN and derives the percentage of RAN resources to be allocated to each given CN. Each CN may provide a percentage allocation directly to the RAN.

In the example of FIG. 3, the MME/SGSN 315 provides an indication to RAN 103 of its portion of RAN resources it should be allocated. For example, Core Network (CN) 311 sends a RAN resource request of 20 at 301 via MME/SGSN 315, and CN 321 send a RAN resource request of 80 at 302 via MME/SGSN 325. RAN 103 upon receiving these RAN resource values would ensure 20% of RAN resources are allocated to CN 1 and 80% to CN 2. At any point in time, a CN may send an updated RAN resource allocation value, and the RAN would dynamically adjust its resource allocation. In such an example implementation, an absolute value of how much RAN resources a CN is allowed can be provided, however the present disclosure is not limited thereto, and other indications of resource allocation can be applied, such as a specific value for a resource, an allocation preset based on the desired implementation of the operator, etc.

In another embodiment, the operator of the example implementations described herein can instead use a scheme of defining the minimum amount of RAN resources. According to some embodiments, a CN may indicate to the RAN 103 that it is to receive a guaranteed minimum amount of RAN resources. Thus, one or more CNs can always be guaranteed a specified minimum amount of RAN resources (e.g., a floor). The RAN may allow a given CN to use more than the requested floor if there is available capacity, but will always guarantee the CN has access to the requested floor/minimum. In cases where the total sum of minimum values requested by each core exceeds the total RAN resources, the RAN may adjust each CN requested minimum to equal the total sum of RAN resources available. The adjustment may preserve the relative percentage of each CN request as compared to the other CN requested minimums.

In both the absolute and guaranteed RAN resource allotment methods, the RAN 103 may segment its resources based on the requested allocation from the respective CNs. In case of absolute allocation method, the RAN 103 may ensure the relative percentage requested is only used for the respective CN, regardless of whether its fully used by that CN. When a given CN device traffic exceeds its allocated RAN resources, the RAN 103 may prioritize the traffic based on the known QoS techniques within that CN's allocated allotment of RAN resources. In case of the guaranteed minimum allocation method, the RAN 103 may guarantee the requested minimum RAN resources are always available. A CN can exceed is requested minimum, but is always ensured it has access to the minimum. As an example, in 3G UMTS, the Radio Network Controller (RNC) 303 may be the entity in RAN 103 that manages and assigns the radio resources for the devices serviced under its coverage area. The RNC 303 uses the QoS parameters provided by the CNs 311 and/or 321 to prioritize traffic within the available RAN resources allocated to that RNC 303. The RNC 303, among other attributes, uses the traffic handling priority and allocation/retention priority provided by the CNs 311 and/or 321 when scheduling the use of RAN resources. As part of an embodiment, the RAN 103 may apply the scheduling of resources within the allocated total amount of RAN resources allocated to that applicable CN. Within each RAN allocation for a given CN, the RAN 103 utilizes its existing QoS methods to manage the traffic, and prioritize when it exceeds the amount allocated to that CN. According to a similar embodiment, when a CN is at risk of falling below a guaranteed minimum allocation of resources, RAN 103 may us QoS parameters provided by other CNs to reduce traffic by the other CNs so as to maintain the guaranteed minimum allocation.

Thus, example implementations address the exchange of the requested RAN resource information from the CNs 102, 202 to the RAN 103. The RAN 103 may use this information to allocate RAN resources according to the identifications by the CNs 102, 202. According to an additional embodiment, a CN can determine its own current usage (loading) of its allocated RAN resources and manage prioritization of its device and their sessions when RAN resources are overloaded or congested. the operator can also utilize a method to manage traffic when RAN is in congestion or overload periods. Thus, during times of RAN congestion and/or overload the core network can apply admission control policy to reduce RAN loading.

Figure 4:
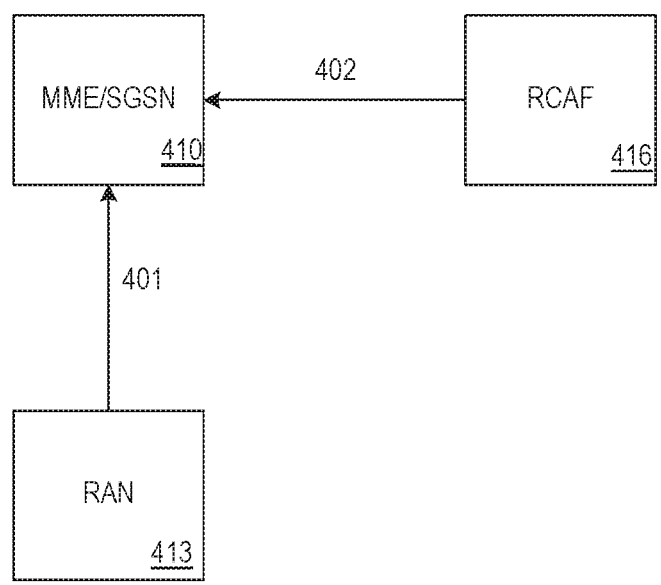
FIG. 4 illustrates an example implementation involving a CN determining its current usage of its allocated RAN resources.

FIG. 4 illustrates an example implementation involving the MME/SGSN 410 receiving current load of a particular RAN node 413 to be used for purposes of determining the current loading and enabling the MME/SGSN 410 to be able to reduce the overall traffic from an associated CN. Reduction in the RAN loading can be influenced through MME/SGSN admission control. For example, an MME/SGSN 410 associated with a particular CN out of a plurality of CNs may apply admission control processes during an overloaded or congested state of the network RAN 413 so as to control the device traffic within its own requested resource allocation. For the MME/SGSN 410 to apply this admission control, the MME/SGSN 410 may informed of the loading of the RAN 413. This loading information can come from multiple sources, such as, but not limited to loading information 401 received directly from the RAN 413 to the MME/SGSN 410 through the respective RAN-Core interfaces (e.g., Gb (GERAN), Iu (UTRAN), and S1-MME (E-UTRAN)), loading information 402 received from an external source with knowledge of RAN 413 loading (e.g., a 3GPP RAN Congestion Awareness Function (RCAF) 416), and/or loading information derived through local analytics of the number of users in a coverage area and their associated bearers which can be stored in the MME/SGSN 410 as internal methods for determining the RAN loading. It should be appreciated that loading or congestion information derived locally at the MME/SGSN 410, or at other elements in a CN.

Thus, in example implementations, load, congestion and overload indications concerning the RAN 413 can be included in the loading information. However, the loading information is not limited thereto, and other information may be included in the loading information, depending on the desired implementation. A RAN 413 that is congested or in overload may be generically referenced as "congested" or a "congestion" in the present disclosure. How loading information is determined and communicated with the MME/SGSN can be implemented through any desired implementation known to one of ordinary skill in the art. Example implementations described herein are directed to examples of the MME/SGSN 410 operation when loading information is used. It should be appreciated that similar components in different network architectures could perform similar functions.

By using loading information, the MME/SGSN 410 can use locally defined policies to take steps to manage the traffic to a specific RAN coverage area through, but not limited to, denying or limiting attachment or mobility into that coverage area, and modification of the QoS attributes for the device bearers in that coverage area. Accordingly, each CN may implement self-governance, and may enforce resource allocation across its own devices so as to manage its use of requested resource allocation across multiple CNs. According to an embodiment, the RAN 413 may conduct traffic management, either in addition to or as an alternative to MME/SGSN 410. For example, the RAN 413 may manage user traffic based on an indicated QoS level, such as an indicator attached with a data packet. According to an embodiment, the managing user traffic may include, but is not limited to at least one of deferring, preempting, and rejecting traffic for lower priority user data.

In example implementations, the 3GPP MME/SGSN 410 may perform admission and mobility control. These 3GPP nodes may determine what devices are allowed access to what parts of the operator's network. The MME/SGSN can reject a device from connecting to the entire coverage area under its control, or it can reject connection in a particular area.

Figure 5:
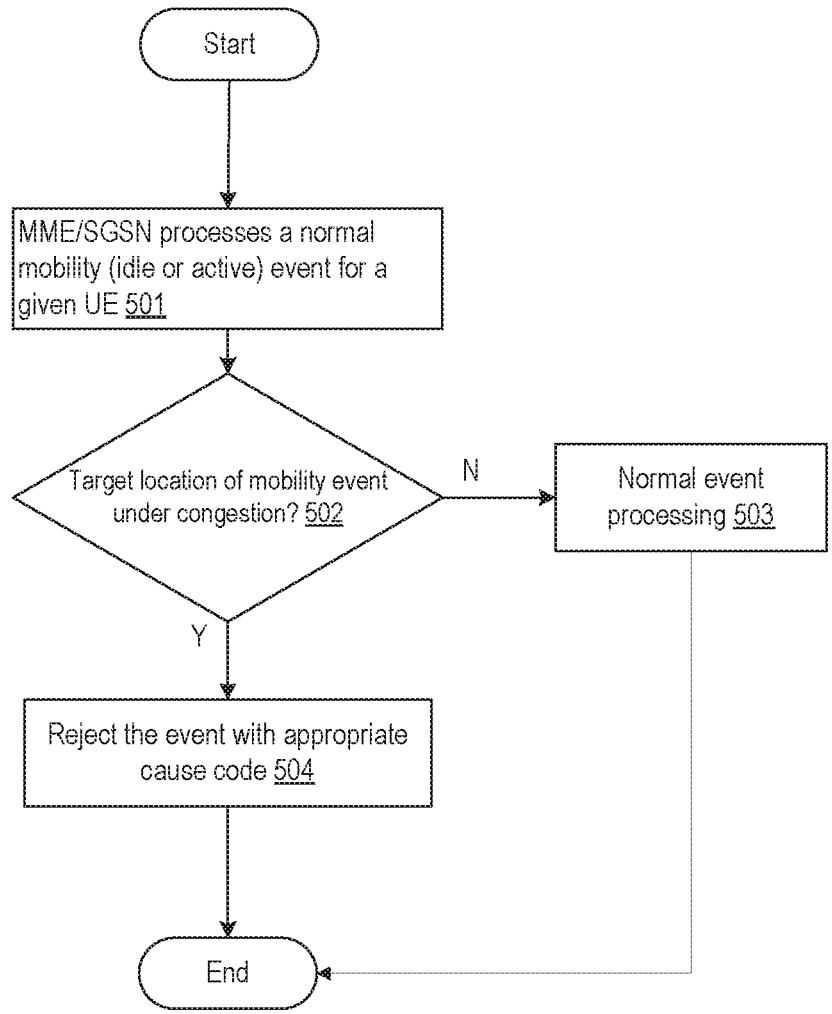
FIG. 5 illustrates an example flow diagram for rejecting an event as means to mitigate RAN congestion, in accordance with an example implementation.

FIG. 5 illustrates an example flow diagram for rejecting an event due to congestion within the CN allocated RAN resources within a specific service area, in accordance with an example implementation. Specifically, FIG. 5 illustrates an example when the MME/SGSN rejects an event due to congestion. As part of the rejection process, the MME/SGSN can optionally provide a delay timer to the UE so that the device will not immediately try to access the network again. At 501, the MME/SGSN processes a normal mobility (idle or active) event for a given UE. At 502, a determination is made as to whether the target location of the mobility event is under congestion. If not (N), then the flow proceeds to 503 wherein normal event processing is conducted. Otherwise, if yes (Y), the flow proceeds to 504 wherein the event is rejected with the appropriate rejection reason (cause code).

Figure 6:
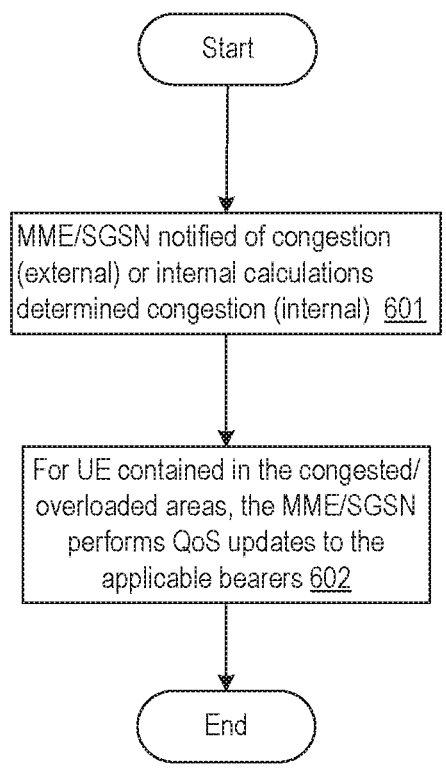
FIG. 6 illustrates an example flow diagram for modifying QoS attributes as means to mitigate RAN congestion, in accordance with an example implementation.

FIG. 6 illustrates an example flow diagram for managing congestion within the CN allocated RAN resources within a specific service area, in accordance with an example implementation. Specifically, FIG. 6 illustrates an example implementation wherein an MME/SGSN can control the particular QoS attributes applied to one or more device bearers. An MME/SGSN, based on a configured policy provided, for example, by the network operator, triggers a QoS update for a given bearer to reduce its impact on the impacted RAN resources. At 601, the MME/SGSN is notified of congestion (external) or the internal calculations of the MME/SGSN determines that there is congestion (internal). At 602, for UE contained in the congested/overloaded areas, the MME/SGSN performs QoS updates to the applicable bearers. It should be appreciated that the example method illustrated in FIG. 6 may be performed for any devices in congested/overloaded areas including, but not limited to smartphones, cars, power meters, agricultural sensors, medical devices, and home appliances.

In additional example implementations besides those illustrated in FIG. 5 and FIG. 6 for managing cases in which the allocated RAN resources for that CN are congested, the MME/SGSN can manage the mobility management events of a device with different implementations in combination therewith or as an alternative, such as, but not limited to determining whether the device is allowed service in a particular area, how often to notify the network of its location, and whether the device is allowed to request radio resources For any of these events, the MME/SGSN can reject the event and/or instruct the device to delay the event for a period of time, all of which are methods for reducing the RAN resources by that CN.

In example implementations, the MME/SGSN can dynamically determine the periodic TAU timer and periodic RAU timer, respectively, whereby a device may perform a location update during an operator defined non-peak time period. According to 3GPP standard implementation, the MME/SGSN may be the functional entity in the CN that provides the UE its periodic reporting timer. In 3GPP the periodic reporting timer may be referred to as the periodic TAU timer on the MME, and the periodic RAU timer on the SGSN. Hereafter both timers will be referenced as a periodic timer. It should be appreciated that the implementations described herein could include on of or both of the TAU and RAU timers, in addition to other timers having similar functions.

Figure 7:
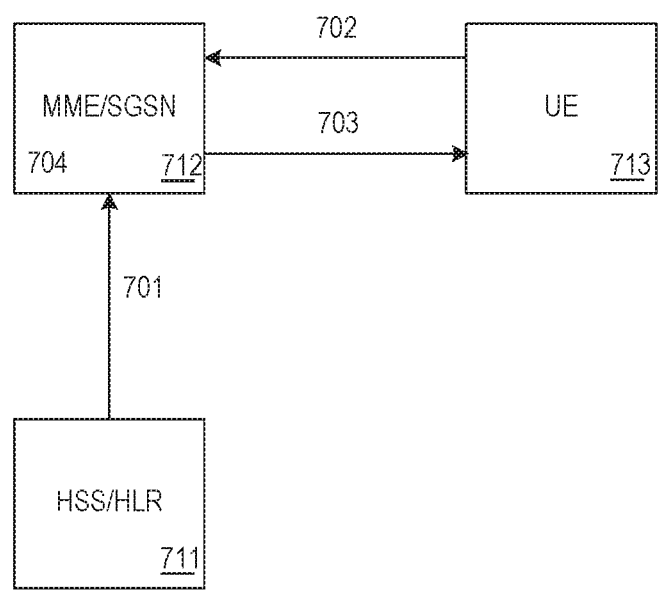
FIG. 7 illustrates provision of periodic timer values, in accordance with an example implementation.

FIG. 7 illustrates provision of timer values, in accordance with an example implementation. Specifically, FIG. 7 illustrates the high-level data points of possible sources of periodic timer values and how they are provided to the end UE. In the example of FIG. 7, a periodic timer 701 can be stored in the Home Subscriber Server (HSS)/Home Location Register (HLR) 711 for a given UE 713 and provided to the MME/SGSN 712. The UE, based on operator values that may be provisioned directly in the device, can provide its requested periodic timer 702 to the MME/SGSN 712 The MME/SGSN 712 can also utilize a locally configured periodic timer 704 for a given UE 713. Further, the MME/SGSN 712 determines the final periodic timer value 703 and provide the same to the UE 713. How the MME/SGSN 712 determines the final periodic timer value using the provide three timers will be based on operator preference and configuration of the MME/SGSN. Thus, as illustrated in FIG. 7, the MME/SGSN 712 has the control to determine the final periodic timer value 703 provided to the UE 713. It should be appreciated that the final periodic timer value 703 may be derived from at least one of the timers 701, 702, and 704, and may further be derived based on information obtained as discussed with reference to FIG. 4, and/or other relevant information for optimizing timer settings.

The example implementations present disclosure adds to the 3GPP standard process by enabling the MME/SGSN 713 to optionally derive a periodic timer value 703 that will occur during a non-peak time. A non-peak time can be operator-specific, and may be configurable by the operator on the MME/SGSN 713. Non-peak time is generally a time or times within a 24-hour period when there is low activity on the operator's CN; e.g. utilization of its RAN resources is low. According to an example implementation, MME/SGSN 713 may derive a periodic timer value 703 for one particular CN of a plurality of CNs so as to maintain usage on that CN within the set allocation of RAN resources.

Figure 8:
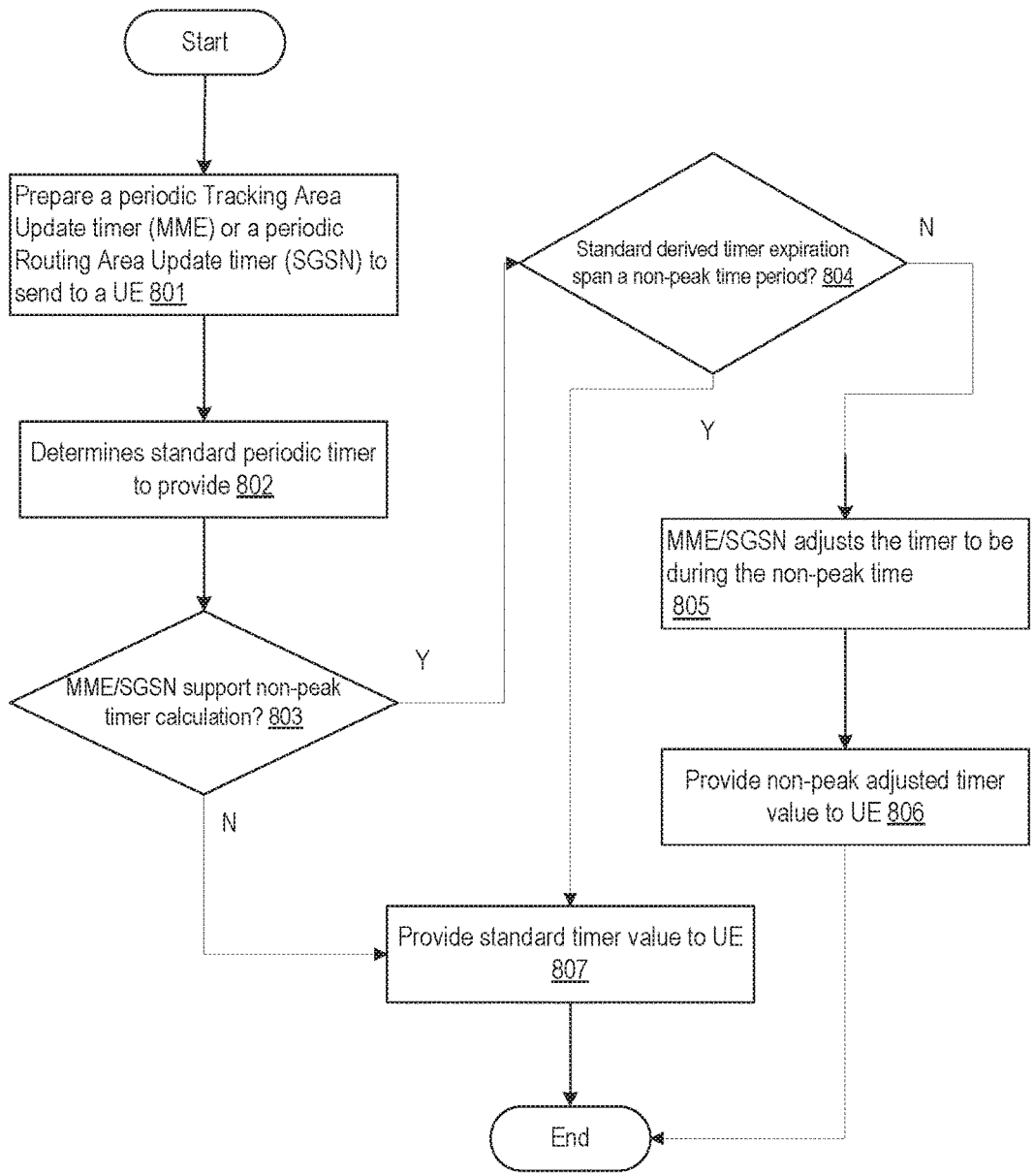
FIG. 8 illustrates a flow diagram that can be applied for periodic timer implementation, in accordance with an example implementation.

FIG. 8 illustrates a flow diagram that can be applied for device periodic timer implementation, in accordance with an example implementation. In 3GPP, Periodic Tracking Area Update (periodic TAU) is associate with the MME, and Periodic Routing Area Update (periodic RAU) is associated with the SGSN. In accordance with these timers, a device may periodically message the network based on the defined TAU/RAU time so the network knows the device is still attached to the network. For example, a device may periodically check in so the network knows it's still there during periods in which there is no other activity from the device. At 801, a periodic TAU timer (MME) or a periodic RAU timer (SGSN) is derived for a UE. This may be accomplished based on operator preferences configured on the MME/SGSN. At 802, a standard periodic timer to provide to a UE is determined. At 803, a determination is made as to whether the MME/SGSN supports non-peak timer calculation. If no (N), then the flow proceeds to 807 to provide the standard timer value to the UE.

Otherwise, if yes (Y), the flow proceeds to 804 wherein a determination is made as to whether the standard derived timer expiration spans a non-peak time period. If so (Y), then the flow proceeds to 807. Otherwise (N), the flow proceeds to 805 wherein the MME/SGSN adjusts the timer to be during the non-peak time. The determination of the level of adjustment of the timer for being before or after the non-adjusted standard timer expiration can be based on a preset time period that is set by the operator or by any other method, depending on the desired implementation. At 806, the non-peak adjusted timer value is provided to the UE from the MME/SGSN. It should be appreciated that this implementation would be particularly beneficial for devices that are less likely to change location, such as, but not limited to power meters, agricultural sensors, medical devices, and home appliances. According to an embodiment, a CN of a plurality of CNs may be provided that is configured to accommodate such devices, and non-peak adjusted timer values are implemented on that CN as part of a configuration of the plurality of CNs.

Figure 9:
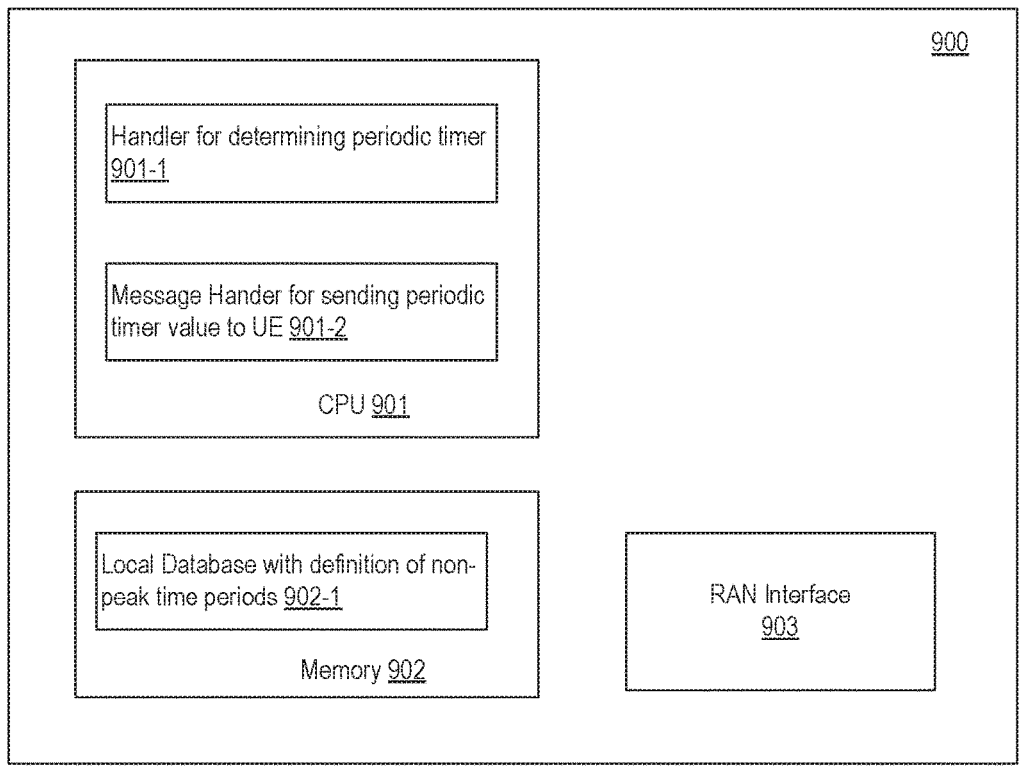
FIG. 9 illustrates an example MME/SGSN upon which example implementations may be applied.

FIG. 9 illustrates an example MME/SGSN apparatus upon which example implementations may be applied. MME/SGSN 900 can include a central processing unit (CPU) 901, which can be made of one or more physical processors (not shown), a memory 902 which can be any memory known to one of ordinary skill in the art depending on the desired implementation (such as, but no limited to flash, hard disk drive, random access memory, etc.), and a RAN interface 903 which interfaces functions of the MME/SGSN 900 with a RAN (not shown). The MME/SGSN 900 may include a handler 901-1 within the MME/SGSN that determines the periodic timer as described with respect to FIG. 8 and in other parts of the description. The MME/SGSN 900 may include a message handler 901-2 that provides this periodic timer value to devices. The specific message when this periodic timer is provided to the device may be governed by, for example, 3GPP specifications. As an example, in the case of the MME, the 3GPP defined Tracking area update procedure can be triggered by the UE sending a 'TAU Request' to the MME, and the MME can reply with a 'TAU Accept' which includes the periodic timer value to be use by the device. It should be appreciated that additional implementations may use other standards. Further, MME/SGSN 900 may include a local configuration 902-1 maintained in a persistent database that defines an operator's non-peak active times. Through use of the example implementations described herein, the MME/SGSN 900 can also learn activity patterns and dynamically establish a particular node's non-peak time; e.g., by "learning" the non-peak times without operator configuration. According to a non-exclusive embodiment, learning may be identified by the amount of signaling generated across a period of time. For example, the MME/SGSN could trend the total sum of UE generated signaling over a day to identify the time periods of lowest traffic. It should be appreciated that the functionality of MME/SGSN 900 may be implemented via components with similar functions implemented within other existing telecommunications standards, or future standards yet to be developed.

Figure 10:
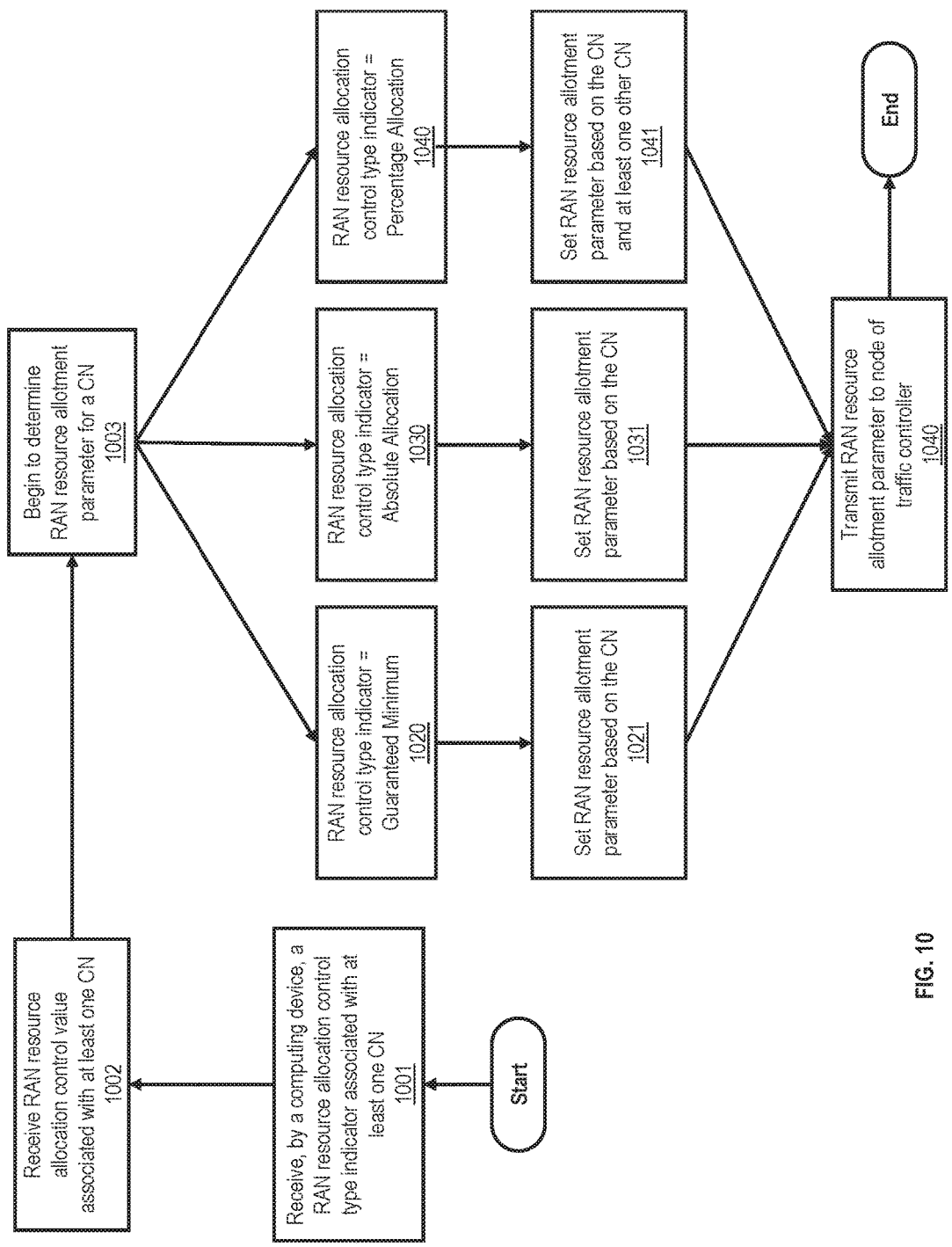
FIG. 10 illustrates an exemplary method for setting a RAN resource allotment parameter, according to an embodiment.

FIG. 10 illustrates an exemplary method for setting a RAN resource allotment parameter, according to an embodiment. At step 1001, a first computing device may receive a RAN resource allocation control type indicator from at least one CN of a plurality of CNs. The computing device may be located on a particular CN, on the RAN, or at a separate location. According to an embodiment, the RAN resource allocation control type indicator may indicate that usage of RAN resources for devices associated with that CN should be governed by a guaranteed minimum regime, an absolute allocation regime, and/or a percentage allocation regime. As described in more detail above, a guaranteed minimum regime can refer to a minimum amount of resources a CN is allocated to the CN, for example in units of RAN resources or as a percentage of available RAN resources. As described more in detail above, an absolute allocation regime can refer to an absolute amount of RAN resources that a CN is allocated, for example in units of RAN resources. As described more in detail above, a percentage allocation regime can refer to a certain percentage of available RAN resources, for example as a percentage, that a CN is allocated.

According to an embodiment, the computing device may receive a RAN resource allocation control type indicator associated with each CN sharing the RAN. According to an embodiment, the computing device may receive a single RAN resource allocation control type indicator associated with all the CNs sharing the RAN. The RAN resource allocation control type indicator may be received from a number of different sources, such as, but not limited to, a pre-configuration file, setup, or routine from an operator, the respective CN with which the RAN resource allocation control type indicator is associated, and/or a central node either on or off the RAN configured to store information regarding at least one CNs associated with the central node. According to an embodiment, the central node may receive information from at least one of the CNs associated with the central node, the shared RAN, or an operator, and determine a RAN resource allocation control type indicator based on the received information. According to another embodiment, some or each of the CNs may transmit to the computing device the RAN resource allocation control type indicator based on a negotiation between at least two of the CNs. It should be appreciated that the computing device may be configured only to handle one type of RAN resource allocation control type indicator.

At step 1002, the computing device may receive a RAN resource allocation control value associated with the at least one CN of the plurality of CNs. The RAN resource allocation control value may represent, for example, a value of a guaranteed minimum amount of RAN resources to be provided to the CN, a value of an absolute allocation of RAN resources to be provided to the CN, and/or a value of a percentage allocation of RAN resources to be provided to the CN. The RAN resource allocation control value may be received from a number of different sources, such as, but not limited to, a pre-configuration by an operator, the respective CN with which the RAN resource allocation control value is associated, and/or a central node either on or off the RAN configured to store information regarding at least one CNs associated with the central node. According to an embodiment, the central node may receive information from at least one of the CNs associated with the central node, the shared RAN, or an operator, and determine the RAN resource allocation control value based on the received information. According to another embodiment, the CNs may transmit to the computing device the RAN resource allocation control value based on a negotiation between at least two of the CNs. It should be appreciated that the RAN resource allocation control value may be the piece of information as the RAN resource allocation control type indicator, such as a single value or a single string of bits, for example where the computing device is configured only to handle one type of RAN resource allocation control type. Steps 1001 and 1002 collectively are also referred to herein as receiving an indication of an amount of resources to be allocated to a CN.

At step 1003, the computing device begins to determine the RAN resource allotment parameter for a CN. If the resource allocation control type indicator is a guaranteed minimum allocation of RAN resources (step 1020), then the computing device may proceed to step 1021. At step 1021, the RAN resource allotment parameter for the CN is set based on the RAN resource allocation control value associated with the CN. For example, if the RAN resource allocation control value associated with the CN is indicative of 5% of RAN resources, then the RAN resource allotment parameter for the CN may be set to indicate that at least 5% of RAN resources are to be allotted to the CN. According to an embodiment, if the RAN resource allocation control value associated with the CN is indicative of 5 units of RAN resources, then the RAN resource allotment parameter for the CN may be set to indicate that at least 5 units of RAN resources are to be allotted to the CN. According to another embodiment, if the RAN resource allocation control value associated with the CN is indicative of 5 units of RAN resources, then the RAN resource allotment parameter for the CN may be set to indicate that at least x % out of all available resources on the RAN are to be allotted to the CN. It should be appreciated that additional permutations may be implemented, such as with a RAN resource allocation control value associated with the CN indicating values based on different units of RAN resources, or a unitless number based on an arbitrary scale. It should also be appreciated that the RAN resource allotment parameter for the CN may be provided in a number of similar units, and may be based on visibility only to values associated the particular CN, or based visibility to values associated with some or all other CNs sharing RAN resources, or based on visibility to total system resources.

If the resource allocation control type indicator is an absolute allocation of RAN resources (step 1030), then the computing device may proceed to step 1031. At step 1031, the RAN resource allotment parameter for the CN is set based on the RAN resource allocation control value associated with the CN. For example, if the RAN resource allocation control value associated with the CN is indicative of x units of RAN resources, then the RAN resource allotment parameter for the CN may be set to indicate that x units of RAN resources are to be allotted to the CN. The units of RAN resources may include, for example, RAN radio resource blocks.

If the resource allocation control type indicator is a percentage allocation of RAN resources (step 1040), then the computing device may proceed to step 1031. At step 1031, the RAN resource allotment parameter for the CN is set based on the RAN resource allocation control value associated with the CN. For example, if the RAN resource allocation control value associated with the CN is indicative of x units, then the RAN resource allotment parameter for the CN may be set to indicate that x units out of the total amount of units associated with other CNs (e.g., x %) are to be allotted to the CN. It should be appreciated, however, that the units of the RAN resource allocation control value may already be provided as a percentage, for example, when preset by a network operator as such, and thus the computing device would not need visibility to RAN resource allocation control values associated with other CNs when setting the RAN resource allotment parameter for a particular CN.

It should be appreciated that the RAN resource allotment parameter may be indicative of a number of different RAN resource allotment types, such as a maximum amount of RAN resources to be allotted or a guaranteed minimum amount of RAN resources to be allotted. These regimes are discussed in detail throughout this disclosure. According to an embodiment, the RAN resource allotment parameter may be indicative of more than one RAN resource allotment type, or a particular CN may be associated with more than one RAN resource allotment parameter for two or more RAN resource allotment types.

Once the RAN resource allotment parameter has been set for the CN, the method may move to step 1040. At step 1040, the RAN resource allotment parameter may be transmitted to a node of a traffic controller. According to an embodiment, the traffic controller may be implemented using existing RAN components for controlling, prioritizing, limiting, or directing traffic. According to another embodiment, the traffic controller may be one or more components in a CN associated with controlling, prioritizing, limiting, or directing traffic or combination of these components. It should be appreciated that another component associated with the computing device may accomplish the transmission at step 1040. For example, if the computing device is located at a central location or on a particular CN, then the transmission may be accomplished by existing connections between the central location and the traffic controller. If the computing device is located in the RAN, then the transmission may be between logical or physical elements associated with the RAN.

Figure 11:
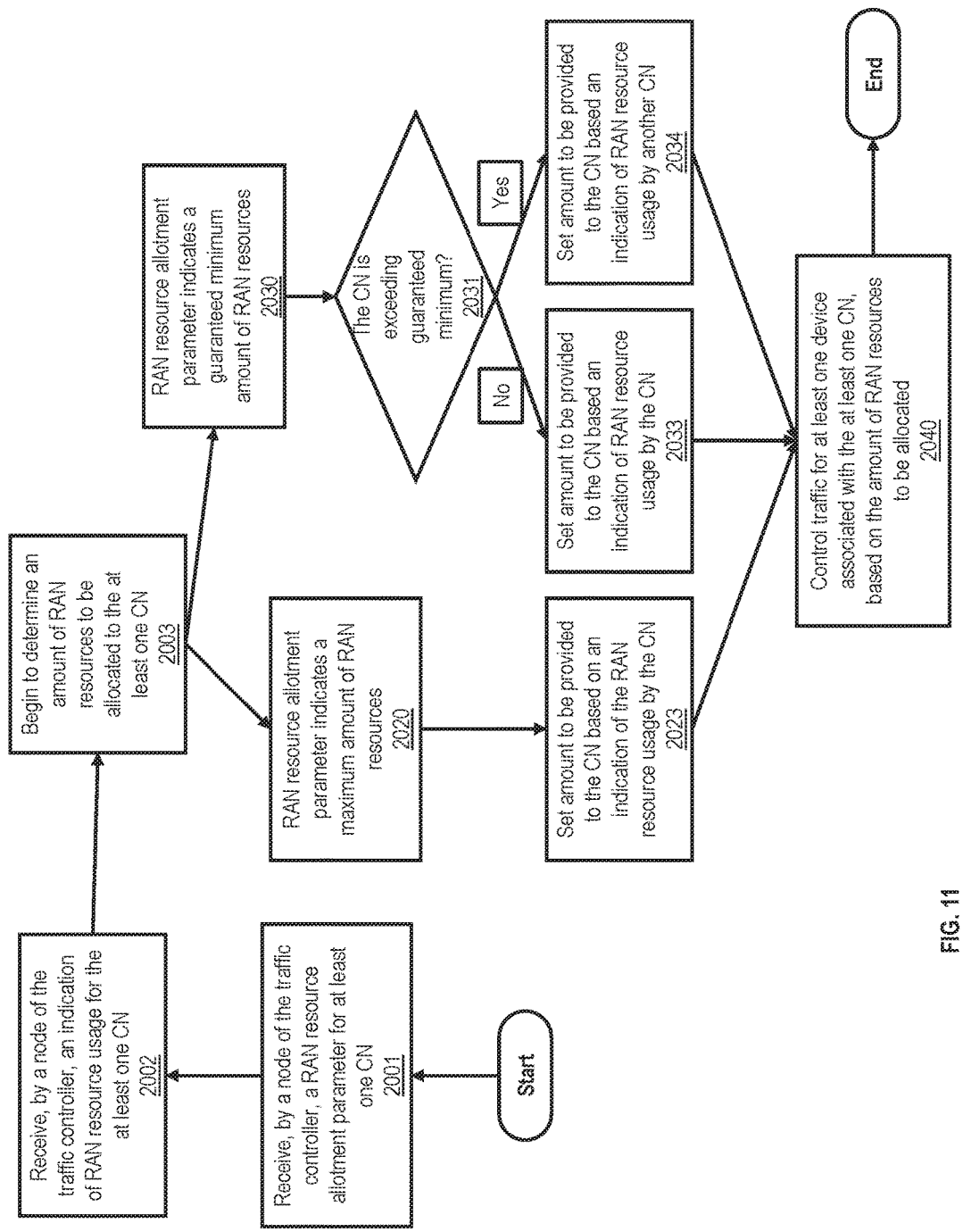
FIG. 11 illustrates an exemplary method of determining an amount of RAN resources to be allocated to a CN, according to an embodiment.

FIG. 11 illustrates an exemplary method of determining an amount of RAN resources to be allocated to a CN, according to an embodiment. At step 2001, a node of a traffic controller may receive a RAN resource allotment parameter for at least one CN of a plurality of CNs that share RAN resources, such as the resource allotment parameter discussed with reference to FIG. 10. According to an embodiment, the traffic controller may receive RAN resource allotment parameters for more than one CN of the plurality of CNs, or all CNs of the plurality CNs. The RAN resource allotment parameter may be received from a computing device, such as the computing device described with reference to FIG. 10.

At step 2002, the traffic controller may receive an indication of RAN resource usage for the at least one CN. The RAN resource usage for the at least one CN may be received from a number of sources as described above, such as the Mobility Management Entity (MME) or Serving GPRS (General Packet Radio Service) Support Node (SGSN) receiving a current loading condition of the RAN. According to some embodiments, this may be received by directly from the RAN or through an external function like the 3GPP defined RAN Congestion Awareness Function (RCAF). According to some embodiments, the traffic controller may be a component in the RAN, and may have visibility to traffic across the RAN, and may calculate RAN usage based on this visibility. According to an embodiment, the traffic controller may receive additional indication(s) of RAN resource usage for other CNs sharing the RAN resources. According to some embodiments, the indication of RAN resource usage for other CNs may be indicative of a congested state of the RAN, or may be specific values associated with other CNs.

At step 2003, the traffic controller begins to determine an amount of RAN resources to be allocated to the at least one CN. If the RAN resource allotment parameter for the at least one CN indicates a maximum amount of RAN resources to be provided (step 2020), then the method may proceed to step 2023. At step 2023, the amount of RAN resources to be provided to the at least one CN may be based on an indication of RAN resource usage by the at least one CN. For example, the traffic controller may compare the indication of RAN resource usage by the at least one CN to a maximum value or percentage of RAN resources allotted to the at least one CN. If the amount of RAN resources associated with the indication of RAN resource usage by the at least one CN exceeds the maximum value or percentage of RAN resources allotted to the CN, then only the maximum value or percentage of RAN resources allotted to the CN may be allocated to the at least one CN. If the amount of RAN resources associated with the indication of RAN resource usage by the at least one CN is less than the maximum value or percentage of RAN resources allotted to the CN, then the amount associated with the indication of RAN resource usage by the at least one CN may be allocated to the at least one CN.

If the RAN resource allotment parameter for the at least one CN indicates a guaranteed minimum amount of RAN resources to be provided (step 2030), then the method may proceed to step 2021. At step 2023, it may be determined whether the amount of RAN resources associated with the indication of RAN resource usage by the at least one CN is or will be exceeding the guaranteed minimum amount of RAN resources associated with the RAN resource allotment parameter for the at least one CN. If the answer is no, then the method may proceed to step 2033. At step 2033, the amount of RAN resources to be provided to the at least one CN is determined based on the amount of RAN resources associated with the indication of RAN resource usage by the at least one CN. For example, the amount of RAN resource usage to be allocated to the at least one CN may be set to be equal to the amount being requested or used. According to some embodiments, the method of determining an amount of RAN resources to allocated to the at least one CN may end after determining that the amount of RAN resources associated with the indication of RAN resource usage by the at least one CN has not exceeded or will be exceed the guaranteed minimum amount of RAN resources associated with the RAN resource allotment parameter for the at least one CN. Accordingly, traffic associated with that CN will not be controlled or limited as discussed with respect to step 2040.

If the answer at step 2031 is yes, then the method proceeds to step 2034. At step 2034, the amount of RAN resources to be provided to the CN may be determined based on an amount of RAN resources associated with an indication of RAN resource usage by at least one other CN. According to an embodiment, the traffic controller may determine if the RAN is in a congested state based on indications of RAN resources usage associated with at least one other CN. The congested state may be determined based on a total amount of RAN resources available to the CNs that share RAN resources with the at least one CN. According to an embodiment, the traffic controller may simply receive an indication of a congestion state. If the RAN is not in a congested state, then the amount of RAN resource usage to be allocated to the at least one CN may be set to be equal to the amount being requested or used. According to some embodiments, the method of determining an amount of RAN resources to allocated to the at least one CN may end after determining that the RAN is not in a congested state, and may not proceed to step 2040.

If it is determined that the RAN is in a congested state, then the amount of RAN resource usage to be allocated to the at least one CN may be based on an amount of RAN resources associated with an indication of RAN resource usage by at least one other CN. For example, the amount of RAN resource usage to be allocated to the at least one CN may be determined so as not to interfere with a guaranteed minimum associated with at least one other CN. According to another embodiment, the amount of RAN resource usage to be allocated to the at least one CN may be determined to be the amount of RAN resources requested by the CN unless that amount would interfere with a guaranteed minimum amount of RAN resources associated with at least one other CN. According to an embodiment, the determination of an amount of RAN resources to be allocated to the at least one CN comprises a bifurcated amount with one part associated with the guaranteed minimum associated with at least one CN and another part associated with an amount in excess of the guaranteed minimum associated with at least one CN.

At step 2040, the traffic controller may control traffic for at least one device associated with the at least one CN based on the amount of RAN resources to be allocated to the at least one CN. According to an embodiment, if amount of RAN resources to be allocated to the at least one CN is equal to or greater than the amount associated with the indication of RAN resource usage by the at least one CN, then the traffic controller may control traffic so as not to limit traffic associated with at least one device associated with the at least one CN. According to an embodiment, if the amount of RAN resources to be allocated to the at least one CN is less than the amount associated with the indication of RAN resource usage by the at least one CN, then the traffic controller may control traffic so as to limit traffic associated with at least one device associated with the at least one CN. For example, the traffic controller may implement QoS or other techniques described herein so as to limit the traffic associated with the at least one CN. According to an embodiment, the traffic controller may provide an indication to other components in either the RAN or the at least one CN to implement QoS or other traffic limiting techniques described herein so as to limit the traffic associated with the at least one CN. According to the method associated with FIG. 11, traffic on the RAN may be controlled so as to enforce the maximum and guaranteed minimum amounts of RAN resources associated with each CN sharing resources of the RAN.

It should be appreciated that each CN may be provided with both a guaranteed minimum and a maximum amount of RAN resources. The traffic controller may be configured to enforce each limitation for each CN of a plurality of CNs. Furthermore, more complicated or elastic traffic control schemes may be implemented so as to alter the controlled traffic based on other parameters, such as, but not limited to time of day, number of users, etc.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out involve physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for one or more desired purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods described herein can be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The invention claimed is:

1. A computerized method for managing one of a plurality of core networks (CNs) sharing a radio access network (RAN), the method comprising:
   receiving, by a computing device, a RAN resource allocation control type indicator associated with at least one first CN of the plurality of CNs, the RAN resource allocation control type indicator indicating a RAN resource allocation control type comprising at least one of:
      a guaranteed minimum allocation of RAN resources;
      an absolute allocation of RAN resources; and
      a percentage-based allocation of RAN resources;
   receiving, by the computing device, a RAN resource allocation control value associated with the at least one first CN of the plurality of CNs;
   determining, by the computing device, a RAN resource allotment parameter for the at least one first CN of the plurality of CNs based on the RAN resource control type, wherein the determining is further based on:
      the RAN resource allocation control value associated with the at least one first CN when the at least one first CN is associated with a guaranteed minimum allocation of RAN resources RAN resource allocation control type,
      the RAN resource allocation control value associated with the at least one first CN when the at least one first CN is associated with an absolute allocation of RAN resources RAN resource allocation control type, or
      the RAN resource allocation control value associated with the at least one first CN and at least one RAN resource allocation control value associated with another CN of the plurality of CNs when a CN is associated with a percentage-based allocation of RAN resources RAN resource allocation control type; and
   transmitting, by the computing device, to a node of a traffic controller the RAN resource allotment parameter and an identification of the associated at least one first CN such that the at least one first CN is allocated an amount of RAN resources based on the resource allotment value.

2. The computerized method of claim 1, wherein the resource allotment parameter comprises at least one of:
   a maximum amount of RAN resources to be provided to the at least one first CN; and
   a minimum guaranteed amount of RAN to be provided to the at least one first CN.

3. The computerized method of claim 2, further comprising:
   receiving, by the node of the traffic controller, the RAN resource allotment parameter for the at least one first CN;
   receiving, by the node of the traffic controller, an indication of RAN resource usage for the least one CN;
   determining, by the traffic controller, the amount of RAN resources to be allocated to the at least one first CN, wherein the determining is based on at least one of:
      the resource allotment parameter for the at least one first CN and an indication of RAN resource usage for the at least one first CN when the RAN resource allotment parameter for the at least one first CN comprises a maximum amount of RAN resources to be provided to the at least one first CN,
      the resource allotment parameter for at least one other CN and an indication of RAN resource usage for the at least one other CN when the RAN resource allotment parameter for the at least one first CN comprises a minimum guaranteed amount of RAN resources to be provided to the at least one first CN, or
      the resource allotment parameter for the at least one first CN and an indication of RAN resource usage for the at least one first CN when the RAN resource allotment parameter for the at least one first CN comprises a minimum guaranteed amount of RAN resources to be provided to the at least one first CN; and
   controlling traffic, by the traffic controller, for at least one device associated with the at least one first CN, based on the amount of RAN resources to be allocated to the at least one first CN.

4. The computerized method of claim 3, wherein the controlling traffic comprises at least one of (a) limiting attachment or mobility of a user equipment (UE) into a RAN coverage area, (b) modifying per device bearer QoS attributes in the RAN coverage area when available RAN resources are exceeded, and (c) managing user traffic based on an indicated QoS level, wherein managing user traffic includes at least one of deferring, preempting, and rejecting traffic for lower priority user data.

5. The computerized method of claim 3, further comprising:
   processing loading information from the RAN indicative of RAN congestion;
   adjusting at least one of the indication of RAN resource usage for the least one CN or an indication of RAN resource usage for at least one other CN based on the loading information; and
   transmitting the adjusted indication to the traffic controller.

6. The computerized method of claim 3, further comprising:
   processing loading information from a RAN congestion awareness function;
   adjusting at least one of the indication of RAN resource usage for the least one CN or an indication of RAN resource usage for at least one other CN based on the loading information; and
   transmitting the adjusted indication to the RAN.

7. The computerized method of claim 1, further comprising:
   receiving, by the computing device, a second RAN resource allocation control type indicator associated with a second CN of the plurality of CNs, the second RAN resource allocation control type indicator indicating a second RAN resource allocation control type comprising at least one of:
      a guaranteed minimum allocation of RAN resources;
      an absolute allocation of RAN resources; and
      a percentage-based allocation of RAN resources; and receiving, by the computing device, a second RAN resource allocation control value associated with the second CN of the plurality of CNs, wherein the RAN resource allocation control type associated with the at least one first CN of the plurality of CNs is different from the second RAN resource allocation control type and the RAN resource allocation control value associated with the at least one first CN of the plurality of CNs is different from the second RAN resource allocation control value.

8. The computerized method of claim 7, wherein the at least one first CN services mobile devices, and the second CN services machine type devices.

9. The computerized method of claim 1, further comprising:
determining a periodic location update timer value for one or more user equipment (UE); and
adjusting the periodic location update timer value based on a determination of non-peak time.

10. The computerized method of claim 9, wherein the periodic location update timer is based on at least one of a provided timer value from the one or more UE, a provided timer value from a home subscriber server (HSS) or a home location register (HLR), and a local MME/SGSN configuration.

11. An apparatus for managing one of a plurality of core networks (CNs) sharing a radio access network (RAN), the apparatus comprising:
memory coupled to the processor and including computer-readable instructions that, when executed by a processor, cause the processor to:
receive a RAN resource allocation control type indicator associated with at least one first CN of the plurality of CNs, the RAN resource allocation control type indicator indicating a RAN resource allocation control type comprising at least one of:
a guaranteed minimum allocation of RAN resources, an absolute allocation of RAN resources, and
a percentage-based allocation of RAN resources;
receive a RAN resource allocation control value associated with the at least one first CN of the plurality of CNs;
determine a RAN resource allotment parameter for the at least one first CN of the plurality of CNs based on the RAN resource allocation control type, wherein the determining is further based on:
the RAN resource allocation control value associated with the at least one first CN when the at least one first CN is associated with a guaranteed minimum allocation of RAN resources RAN resource allocation control type,
the RAN resource allocation control value associated with the at least one first CN when the at least one first CN is associated with an absolute allocation of RAN resources RAN resource allocation control type, or
the RAN resource allocation control value associated with the at least one first CN and at least one RAN resource allocation control value associated with another CN of the plurality of CNs when a CN is associated with a percentage-based allocation of RAN resources RAN resource allocation control type; and
transmit to a node of a traffic controller the RAN resource allotment parameter and an identification of the associated at least one first CN such that the at least one first CN is allocated an amount of RAN resources based on the resource allotment value.

12. The apparatus of claim 11, wherein the resource allotment parameter comprises at least one of:
a maximum amount of RAN resources to be provided to the at least one first CN; and
a minimum guaranteed amount of RAN to be provided to the at least one first CN.

13. The apparatus of claim 12, wherein the traffic controller is further configured to:
receive the RAN resource allotment parameter for the at least one first CN;
receive an indication of RAN resource usage for the least one CN;
determine the amount of RAN resources to be allocated to the at least one first CN, wherein the determining is based on at least one of:
the resource allotment parameter for the at least one first CN and an indication of RAN resource usage for the at least one first CN when the RAN resource allotment parameter for the at least one first CN comprises a maximum amount of RAN resources to be provided to the at least one first CN,
the resource allotment parameter for at least one other CN and an indication of RAN resource usage for the at least one other CN when the RAN resource allotment parameter for the at least one first CN comprises a minimum guaranteed amount of RAN resources to be provided to the at least one first CN, or
the resource allotment parameter for the at least one first CN and an indication of RAN resource usage for the at least one first CN when the RAN resource allotment parameter for the at least one first CN comprises a minimum guaranteed amount of RAN resources to be provided to the at least one first CN; and
control traffic for at least one device associated with the at least one first CN, based on the amount of RAN resources to be allocated to the at least one first CN.

14. The apparatus of claim 13, wherein the traffic controller is further configured to control traffic by at least one of (a) limiting attachment or mobility of a user equipment (UE) into a RAN coverage area, (b) modifying per device bearer QoS attributes in the RAN coverage area when available RAN resources are exceeded, and (c) managing user traffic based on an indicated QoS level, wherein managing user traffic includes at least one of deferring, preempting, and rejecting traffic for lower priority user data.

15. The apparatus of claim 13, further comprising a loading element configured to:
process loading information from the RAN indicative of RAN congestion;
adjust at least one of the indication of RAN resource usage for the least one CN or an indication of RAN resource usage for at least one other CN based on the loading information; and
transmit the adjusted indication to the traffic controller.

16. The apparatus of claim 13, further comprising a loading element configured to:
process loading information from a RAN congestion awareness function;
adjust at least one of the indication of RAN resource usage for the least one CN or an indication of RAN resource usage for at least one other CN based on the loading information; and
transmit the adjusted indication to the RAN.

17. The apparatus of claim 11, wherein the apparatus is further caused to:
receive a second RAN resource allocation control type indicator associated with a second CN of the plurality of CNs, the second RAN resource allocation control type indicator indicating a second RAN resource allocation control type comprising at least one of:
a guaranteed minimum allocation of RAN resources;
an absolute allocation of RAN resources; and
a percentage-based allocation of RAN resources; and
receive a second RAN resource allocation control value associated with the second CN of the plurality of CNs, wherein the RAN resource allocation control type associated with the at least one first CN of the plurality of CNs is different from the second RAN resource allocation control type and the RAN resource allocation control value associated with the at least one first CN of the plurality of CNs is different from the second RAN resource allocation control value.

18. The apparatus of claim 17, wherein the at least one first CN services mobile devices, and the second CN services machine type devices.

19. The apparatus of claim 12, further comprising a timing controller configured to:
determine a periodic location update timer value for one or more user equipment (UE); and
adjust the periodic location update timer value based on a determination of non-peak time.

20. The apparatus of claim 19, wherein the periodic location update timer is based on at least one of a provided timer value from the one or more UE, a provided timer value from a home subscriber server (HSS) or a home location register (HLR), and a local MME/SGSN configuration.

* * * * *